United States Patent [19]

van der Schoot

[11] 4,356,920

[45] Nov. 2, 1982

[54] METHOD AND APPARATUS FOR GRADING AND FURTHER PROCESSING EGGS

[75] Inventor: Jelle van der Schoot, Aalten, Netherlands

[73] Assignee: Staalkat B.V., Aalten, Netherlands

[21] Appl. No.: 206,681

[22] Filed: Nov. 13, 1980

[30] Foreign Application Priority Data

Nov. 16, 1979 [NL] Netherlands .......................... 7908406

[51] Int. Cl.³ .............................................. A01K 43/08
[52] U.S. Cl. ...................................... 209/513; 209/933
[58] Field of Search ............... 209/512, 513, 514, 515, 209/516, 592, 593, 594, 595, 596, 933; 198/435, 349

[56] References Cited

U.S. PATENT DOCUMENTS

| | | | |
|---|---|---|---|
| 2,020,511 | 11/1935 | McHenry | 209/513 |
| 2,933,176 | 4/1960 | Mansson | 198/799 |
| 3,505,698 | 4/1970 | van der Schoot | 15/313 |
| 3,759,368 | 9/1973 | Rose | 198/437 |
| 3,928,184 | 12/1975 | Anschutz | 209/513 |
| 4,033,862 | 7/1977 | Spencer | 198/435 X |
| 4,086,998 | 5/1978 | van der Schoot | 198/358 |

FOREIGN PATENT DOCUMENTS

| | | |
|---|---|---|
| 2157774 | 11/1971 | Fed. Rep. of Germany . |
| 2216913 | 8/1974 | France . |
| 127173 | 4/1963 | Netherlands . |
| 487053 | 4/1970 | Switzerland . |

*Primary Examiner*—Allen N. Knowles
*Attorney, Agent, or Firm*—Cushman, Darby & Cushman

[57] ABSTRACT

Method and apparatus for weight grading and further processing eggs. After being weighed, the eggs are supplied to a conveyor for the transportation of the weighed eggs to a plurality of buffers, such as belts arranged in a refrigerated space, each said buffer being adapted to receive eggs of a given weight class, and from which the eggs can be discharged in the unpacked state when needed.

7 Claims, 3 Drawing Figures

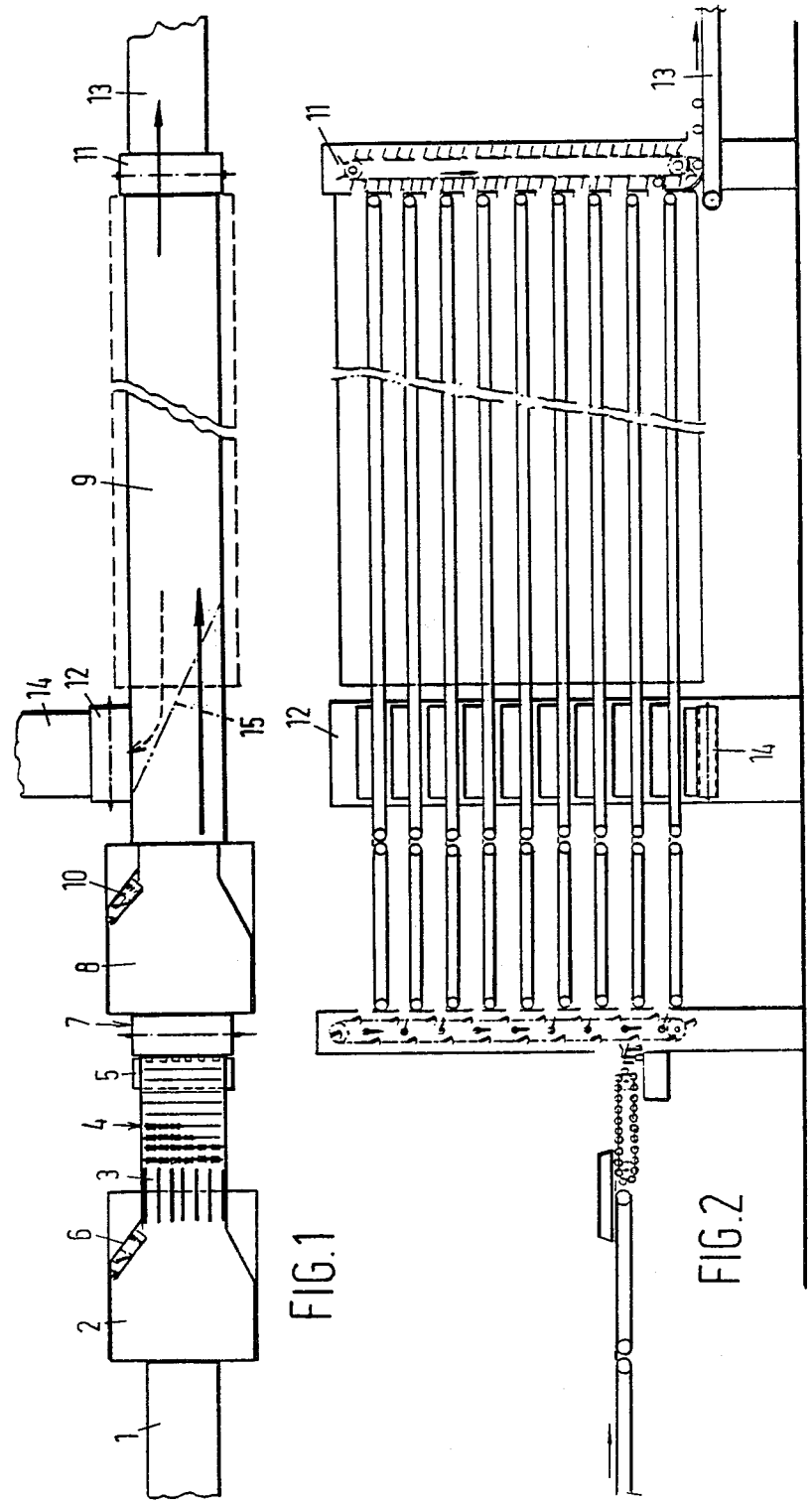

METHOD AND APPARATUS FOR GRADING AND FURTHER PROCESSING EGGS

This invention relates to a method of weight grading and further processing eggs.

Up until now, after being collected at the production station, eggs have been stored in unsorted condition, subsequently transported to a packing station and there unpacked, graded as to weight, and subsequently packed in the desired retail package.

In carrying out this method, use can be made, for example, of an apparatus as described in our U.S. Pat. No. 4,086,998.

One disadvantage of this method is that when the eggs are stored in unsorted condition after being collected at the production unit, one does not know the quantities of eggs per class, which, however, is an urgent requirement for smooth handling, in particular in the case of bulk orders.

It is an object of the present invention to remedy this disadvantage.

For this purpose the eggs are, on the poultry farm, supplied from a supply belt via an accumulation belt to a device for simultaneously weighing a plurality of eggs, whereafter the eggs are transferred from said device to a conveyor for transporting weighed eggs to a plurality of buffer means, e.g. belts disposed in a refrigerated space, each of said buffer means being designed to receive eggs of a given weight class, and from which the eggs may be discharged in unpacked condition on demand. By virtue of this arrangement, the number of eggs per class that is available in unpacked condition is known at any moment. When ordered, the eggs can immediately be packed in the desired retail package by means of a single packing machine. This last is different from the apparatus described in the above U.S. patent, in which, after being graded, the eggs are packed in a given retail package through a separate packing machine for each class.

The method of the present invention has the additional advantage of making weekend work for a large group of people unnecessary, as in essence only one operator or supervisor is required.

The invention further relates to an apparatus for carrying out the method, which apparatus comprises an egg supplying belt, an accumulation belt, a device for simultaneously weighing a plurality of eggs supplied by said egg supplying belt, a conveyor, and a plurality of buffer belts disposed in a refrigerated space, the delivery ends of which buffer belts can be connected to a device for discharging unpacked eggs.

In one embodiment of the apparatus according to the invention, said conveyor is an elevator equipped with holders, and by means of which the eggs can be supplied to buffer belts arranged one above the other and designed as tunnel conveyors.

Between the elevator and each tunnel conveyor an accumulator may be arranged, equipped with means for operating the tunnel conveyor. It is thus ensured that the tunnel conveyors are filled with a serried quantity of eggs.

In a further elaboration of the invention, each tunnel conveyor is movable in both longitudinal directions, and a discharge device can be connected to it both at its supply end and at its delivery end, so that the tunnel conveyor concerned can transport eggs alternatively to its supply end or its delivery end, depending on its degree of filling.

The discharge device referred to above may consist of an elevator common to all buffer belts and positioned at at least one of the ends of the buffer conveyors.

One embodiment of the apparatus for weight-grading and further processing eggs according to the present invention will now be described, by way of example, with reference to the accompanying drawings, in which:

FIG. 1 is a diagrammatic plan view of the apparatus according to the invention;

FIG. 2 is a side-elevational view of the apparatus shown in FIG. 1; and

Figure 3:
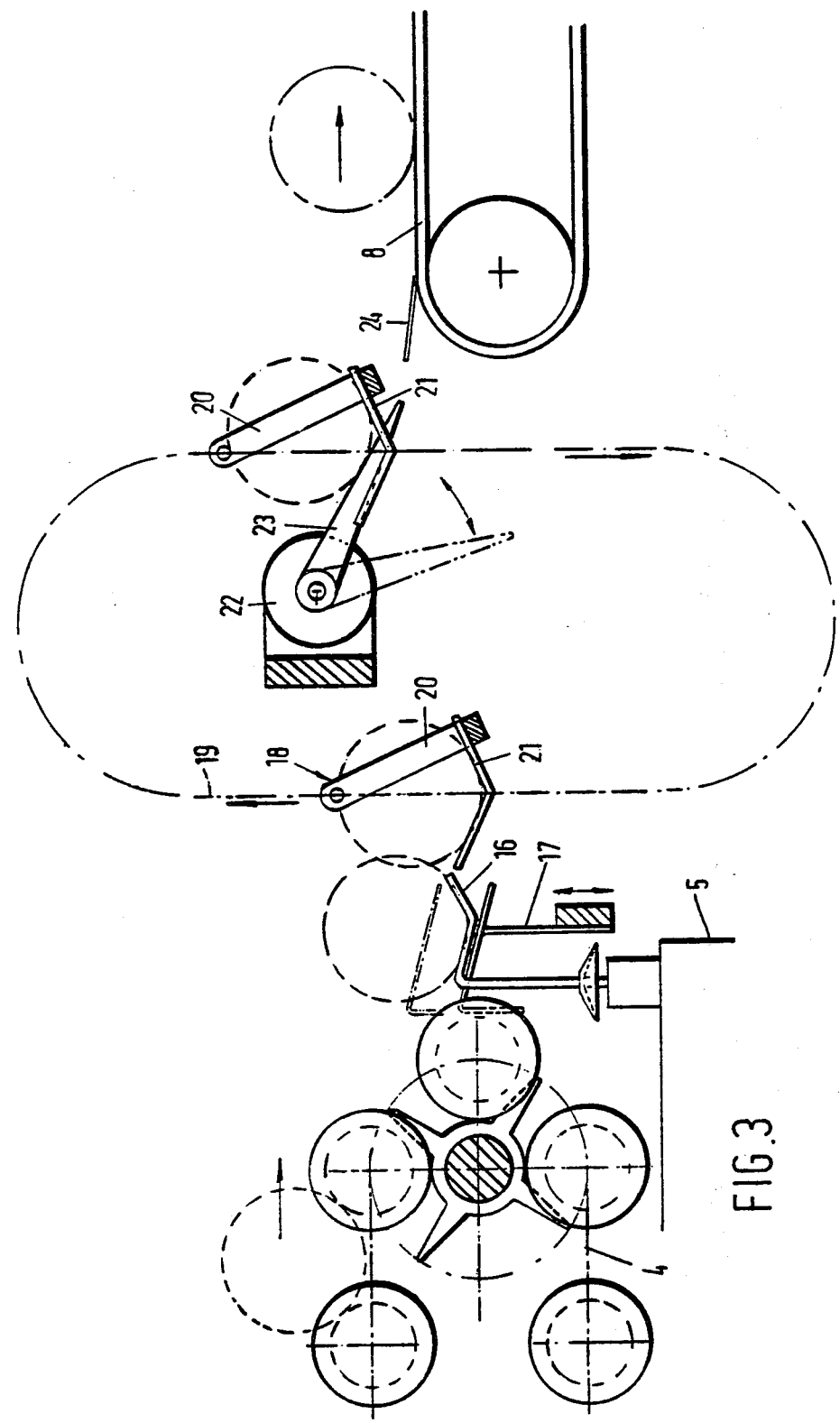
FIG. 3 illustrates a detail of the apparatus shown in FIG. 2 on a larger scale.

Referring to FIGS. 1 and 2, a egg grader comprises an egg supplying belt 1, by means of which eggs can be supplied from the laying house direct to the grader. The egg supplying belt delivers the eggs to an accumulation belt 2 or an accumulation plate, as described in our U.S. Pat. No. 4,086,998. From the accumulation belt, the eggs are supplied via gate walls 3, which make a vibratory movement in order to prevent the randomly arranged eggs from becoming jammed (see our U.S. Pat. No. 3,974,494) to a roller conveyor 4, and thence to a weighing unit 5 as described in our U.S. Pat. No. 3,980,147.

As shown in the drawings, a thrust plate 6 is provided above the accumulation belt, which is equipped with a switch for operating the supply belt 1. This makes it possible to stop the supply belt in the event of an unduly large supply to the accumulation belt (see U.S. Pat. No. 4,086,998).

From weighing unit 5, the eggs are supplied via an elevator 7 to an accumulation belt 8 destined for the weight class concerned, and next to a subsequent tunnel conveyor 9. Disposed above each accumulation belt 8 is a thrust plate 10 similar to thrust plate 6. The function of thrust plate 10, however, is to start the tunnel conveyor 9 when accumulation belt 8 is full, and stopping the tunnel conveyor again after a certain period of time. It is thus achieved that the eggs fill the tunnel conveyor in serried formation.

Elevators 11 and 12 are disposed at the delivery end and at the supply end of tunnel conveyor 9, respectively, by means of which elevators the eggs can be transferred from the tunnel conveyor concerned to a discharge device, i.e. discharge belt 13 or 14 for further processing, i.e. packing the eggs on call.

When the tunnel conveyor is full the eggs will be discharged in the direction indicated by a fully drawn arrow, i.e. via elevator 11 and discharge belt 13, and when it is filled in part only, they will be discharged in the direction indicated by a dotted arrow via elevator 12 and discharge belt 14. In order to move the eggs towards elevator 12, a vertically adjustable slide 15 is arranged above the belt.

There will now follow a description, with reference to FIG. 3, of the transportation of the eggs from the weighing unit 5 to accumulation belts 8.

Weighing unit 5 is provided in known manner (see U.S. Pat. No. 3,980,147) with a plurality of balance egg carriers, disposed in side-by-side relationship and in this case each consisting of two or more side-by-side channel-shaped fingers 16. After an egg has been weighed, this is lifted off fingers 16 by means of a vertically movable lifter 17 and rolls into a holder 18 of elevator 7, which may be of the kind as described in Dutch Pat. No. 128,724, which corresponds to U.S. Pat. No. 3,505,698. Holders 18 consist of brackets 20 suspended from an endless chain 19, shown diagrammatically, and carrying channel-shaped fingers 21.

After the egg has been weighed, the weight information, i.e. the class to which the egg belongs is passed to a shift register which provides for operation, at the correct moment, of a rotary-stroke magnet 22 disposed in juxtaposition to the accumulation belt concerned (a device having a similar action is described in U.S. Pat. No. 4,086,998). Magnet 22 is provided with a flap or fingers 23, movable in the manner indicated in FIG. 3, for nudging an egg out of its holder as chain 19 moves downwardly. The egg will then roll via a transfer plate 24 onto the accumulation belt 8 concerned and thence to the corresponding tunnel conveyor 9. Conveyor 9 may, for example, comprise a flat belt or a roller or bar conveyor.

As stated before, the apparatus according to the invention has a large number of advantages. It is sufficient to have one packing line (machine). Weekend work for a whole team of attendants or operators can be dispensed with. When large orders are placed, it can immediately be checked whether the required number of eggs (of the class concerned) is present at one or more farms. If so, only these eggs need to be collected instead of first collecting all of the eggs and subsequently sorting, as has hitherto been the conventional method.

It will be clear that a large number of changes and modifications can be made without departing from the scope of the invention.

What I claim is:

1. A method of weight grading and further processing unpackaged eggs comprising supplying eggs to a weighing station, weighing a plurality of eggs simultaneously at the weighing station to determine the weight class to which each egg belongs, transferring the weighed eggs from the weighing station to a conveyor which transports and discharges the eggs in unpackaged condition, according to their weight class, to a plurality of storage belts, each belt receiving eggs of a given weight class, storing the unpackaged eggs on the storage belts, and subsequently discharging eggs of a given weight class from the respective belt, on demand, to a packaging machine.

2. A method as in claim 1 wherein the storage belts are located in a refrigerated space.

3. Apparatus for weight grading and further processing unpackaged eggs comprising an egg supplying belt, an accumulation belt for receiving the eggs from the supplying belt, a weighing device for receiving the eggs from the accumulation belt and for weighing a plurality of eggs simultaneously to determine the weight class to which each egg belongs, a looped elevator conveyor having a plurality of egg holders each of which is adapted to receive one egg from the weighing device, a plurality of storage belts each designated to receive eggs of a given weight class, and means for discharging each egg from its holder to one of said storage belts in accordance with the weight class of that egg, and means for selectively discharging eggs from each storage belt to a packaging machine.

4. Apparatus as in claim 3 wherein the storage belts are located in a refrigerated space.

5. Apparatus as in claim 3 including an egg accumulator assembly between said elevator conveyor and said plurality of storage belts, said accumulator assembly including means for operating said storage belts.

6. Apparatus as in claim 3 wherein the storage belts are movable in both longitudinal directions and wherein there is an egg discharge means at both ends of the storage belts.

7. Apparatus as in claim 3 wherein said egg discharge means includes an elevator common to all of said storage belts.

* * * * *